United States Patent [19]
Ota

[11] Patent Number: 5,148,833
[45] Date of Patent: Sep. 22, 1992

[54] HIGH-SPEED FLOW CONTROL VALVE

[75] Inventor: Kazuo Ota, Hiratsuka, Japan

[73] Assignee: Kabushiki Kaisha Komatsu Seisakusho, Tokyo, Japan

[21] Appl. No.: 691,025

[22] PCT Filed: Dec. 18, 1989

[86] PCT No.: PCT/JP89/01272
§ 371 Date: Jun. 21, 1991
§ 102(e) Date: Jun. 21, 1991

[87] PCT Pub. No.: WO90/07667
PCT Pub. Date: Jul. 12, 1990

[30] Foreign Application Priority Data
Dec. 23, 1988 [JP] Japan .................. 63-325540

[51] Int. Cl.$^5$ ............................. F15B 13/044
[52] U.S. Cl. ................. 137/625.65; 251/129.06
[58] Field of Search ............. 137/625.65; 251/129.06

[56] References Cited
U.S. PATENT DOCUMENTS

| | | | |
|---|---|---|---|
| 3,614,486 | 10/1971 | Smiley | 251/129.06 X |
| 4,617,969 | 10/1986 | Weiger | 251/129.06 X |
| 4,825,894 | 5/1989 | Cummins | 251/129.06 X |

FOREIGN PATENT DOCUMENTS

| | | |
|---|---|---|
| 62-215176 | 9/1987 | Japan . |
| 62-283273 | 12/1987 | Japan . |
| 62-283274 | 12/1987 | Japan . |

Primary Examiner—Gerald A. Michalsky
Attorney, Agent, or Firm—Richards, Medlock & Andrews

[57] ABSTRACT

A first conversion means amplifies the directly operated displacement of a laminated piezoelectric actuator and converts it to a rotary displacement. A second conversion means reversely converts this rotary displacement to a directly operated displacement for the purpose of driving a valve spool. The directly operated displacement of the piezoelectric actuator can be converted to a rotary displacement by placing the piezoelectric actuator in contact with a cam disposed on a first rotatable shaft so that a rotary tangential line force will act at a position deviated a fixed amount from the center of the first shaft. The displacement amount of the piezoelectric actuator is amplified by the combination of a gear disposed on the first shaft and a pinion disposed on a second shaft, with the second shaft being parallel to the first shaft. The second conversion means, which converts the rotation of the second shaft to the linear displacement of valve spool, can be a rack and pinion mechanism. The first conversion means can be a plate having a ball nut which is directly displaced by the piezoelectric actuator, with the ball nut rotating a ball screw shaft. The second conversion means can be a rotary cam on the shaft and a cam follower connected to the valve spool.

20 Claims, 7 Drawing Sheets

HIGH-SPEED FLOW CONTROL VALVE

BACKGROUND OF THE INVENTION

1. Field of the Invention

The present invention relates to a flow control valve for use in robots, etc. and, in particular, to a high-speed flow control valve having excellent high-speed response for medium to high pressures and capable of performing continuous control easily.

2. Description of the Related Art

Figure 7:
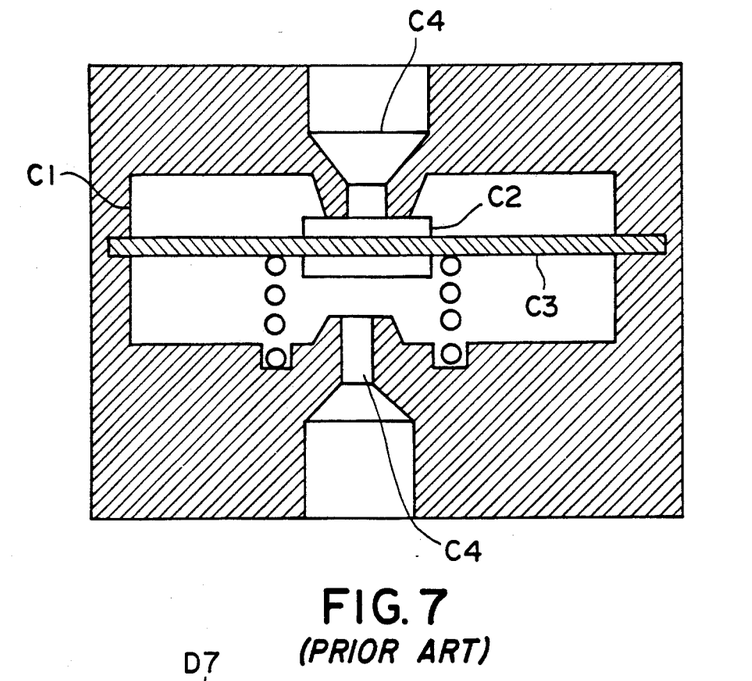
FIGS. 7 and 8 are cross sectional views of a flow control valve each in which a conventional piezoelectric body is used as a driving source.
Figure 8:
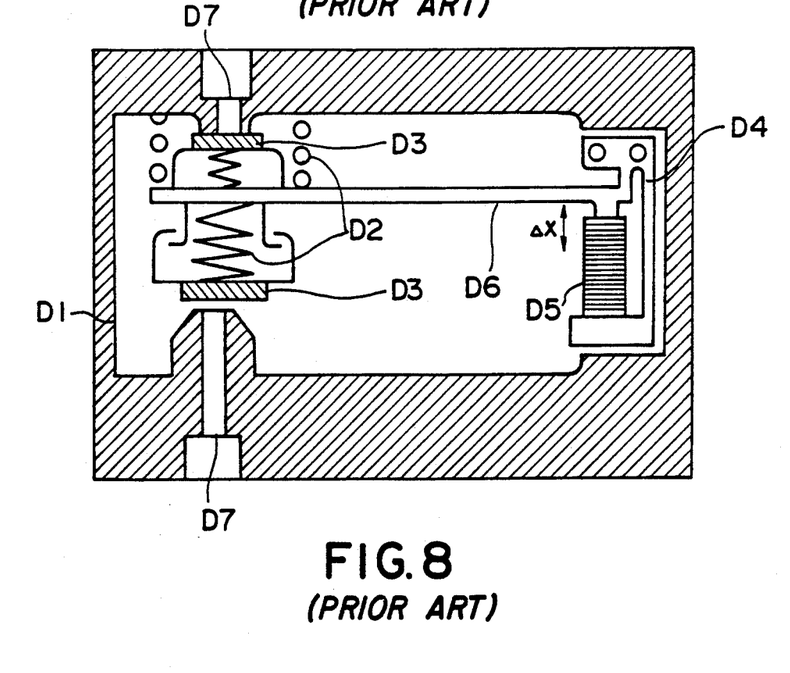

As a flow control valve in which a piezoelectric body is used as a driving source, those disclosed in Japanese Patent Laid-Open Nos. 62-283273 and 62-283274 have been known. To explain these valves with reference to FIGS. 7 and 8, a flow control valve in the former patent is so arranged that a bimorph piezoelectric plate C3 having a valve seat C2 in the center inside a valve chest C1 is laterally installed, as shown in FIG. 7, and the opening and closing of a flow path is performed by making the above-mentioned valve seat C2 move closely to and separately from an air flow slot C4 disposed on the wall of the valve chest. As shown in FIG. 8, a flow control valve in the latter patent is so arranged that an arm D6 is disposed in such a manner as to be laterally placed inside a valve chest D1, and one end of this arm D6 is connected to a fixed fulcrum D4 and held in a cantilevered form. The front end of the arm D6 is capable of performing a flexing movement and a pair of air flow slots D7 opened in the valve chest D1 are disposed facing this flexing direction. A valve seat D3 having a spring D2 energized in the direction in which the air flow slots D7 are closed is disposed in the front end of the arm D6. An electrostrictive element D5 for forcedly providing a flexing movement to the arm D6 is disposed between fixation sections in the vicinity of the fulcrum D4 of the arm D6. As a result, the flexing movement is caused by amplifying the amount of the directly operated displacement Δx of the electrostrictive element D5 by means of the arm D6 so that the valve seat D3 is made to move closely to and separately from the air flow slots D7 disposed on the wall of the valve chest so as to open and close a flow path. It is considered that any of these flow control valves is convenient for use in pneumatic low-pressure oil flow control valves or the like.

However, when the above-mentioned conventional flow control valve is sued for medium to high pressures, there arises such drawbacks as described below.

(1) In the former flow control valve, flexing oscillation is caused in the piezoelectric plate C3 so as to open and close the valve seat C2 and the air flow slot C4 at high speed. Although this flow control valve can perform high-speed control easily as described above, since the opening and closing force of a valve at maximum is limited to approximately 100 g, there exists a difficulty in using the valve for medium to high pressures.

(2) In the latter flow control valve, there is a limitation in that the spring D2 must be one having a spring constant in the range not exerting an influence on the arm D6. For this reason, this valve is not suited as a flow control valve for medium to high pressures that requires a large spring constant. If it were used as a flow control valve for medium to high pressures that requires a large spring constant. If it were used as a flow control valve for medium to high pressures without modifications, since the spring constant is low, the displacement loss of a valve seat becomes larger because of the reaction force of fluid pressure and a drawback such that fluid control cannot be performed with high accuracy will arise.

SUMMARY OF THE INVENTION

The present invention has been devised in light of the above-mentioned circumstances. An object of the present invention is to provide a high-speed flow control valve, with a piezoelectric body as a driving source, having excellent high-speed response for medium to high pressures and capable of performing continuous flow control.

In order to achieve the above-mentioned object, the high-speed flow control valve of the present invention comprises a laminated piezoelectric actuator which is a driving source, a first conversion means for converting a directly operated displacement of the laminated piezoelectric actuator to a rotary displacement, a second conversion means for returning the rotary displacement to a directly operated displacement, and a valve spool which operates in linkage with the second conversion means. In this case, it is preferable that a mechanism for amplifying displacement be disposed in the conversion section of the first conversion means. The first conversion means should include a first shaft on which a gear lever is mounted and a second shaft on which a pinion that engages with the gear are mounted, and a cam for receiving the directly operated displacement of the laminated piezoelectric actuator as a rotary tangential line force at a position deviated from the shaft center should be disposed on the first shaft. In addition, the second conversion means may be formed from a rack connected to the valve spool and a pinion that engages with this rack. The first conversion means includes a shaft which is rotatably supported and a plate that is displaced in linkage with the laminated piezoelectric actuator and converts the displacement of the plate to the rotation of the shaft with the engagement section between the shaft and the plate as a screw engagement. The second conversion means may also be formed from a cam disposed on the rotary cam and a cam follower connected to the valve spool. In this case, the screw engagement is formed from a ball screw having small leads so that a directly operated displacement can be converted to a rotary displacement easily.

With such construction, the amount of the directly operated displacement of the laminated piezoelectric actuator is converted to the amount of rotary displacement once by means of the first conversion means and further returned to the amount of the directly operated displacement by means of the second conversion means. Hereafter, the flow control valve that operates in linkage with the second conversion means is made to operate. This flow control valve refers to a so-called spool type, poppet type valve, or other valves having a flow control function. This operation enables the amount of the directly operated displacement of the laminated piezoelectric actuator to be converted by means of the first and second conversion means. Since the amount of a rotary displacement is returned again to the amount of the directly operated displacement in the second conversion means, the amount of this directly operated displacement can be a value (linear amount) proportional to the original amount of the directly operated displacement of the laminated piezoelectric actuator. If a means having mechanical strength is used as the first conversion means and/or the second conversion means, it is possible to control the quantity of flow regardless of how high or how low the fluid pressure is. As a result, this means can be used for medium to high pressures. Further, since the driving of the laminated piezoelectric actuator is generated by electrical control which is easy to handle, and since, as mentioned earlier, a linear amount proportional to the original directly operated displacement of the laminated piezoelectric actuator is output regardless of the fact that the directly operated displacement is slight or occurs at any position, a flow control valve having excellent high-speed response and capable of performing continuous flow control can be obtained.

These and other object, features and advantages of the present invention will become clear when reference is made to the following description of the preferred embodiments of the present invention, together with reference to the accompanying drawings.

BRIEF DESCRIPTION OF THE DRAWINGS

FIGS. 3 and 4 are views showing an example in which the above-mentioned first embodiment is used;

FIGS. 5 and 6 are views showing an example in which the above-mentioned second embodiment is used;

DETAILED DESCRIPTION OF THE PREFERRED EMBODIMENTS

The embodiments of a high-speed flow control valve of the present invention and examples of its uses will be explained herein under with reference to the accompanying drawings.

Figure 1A:
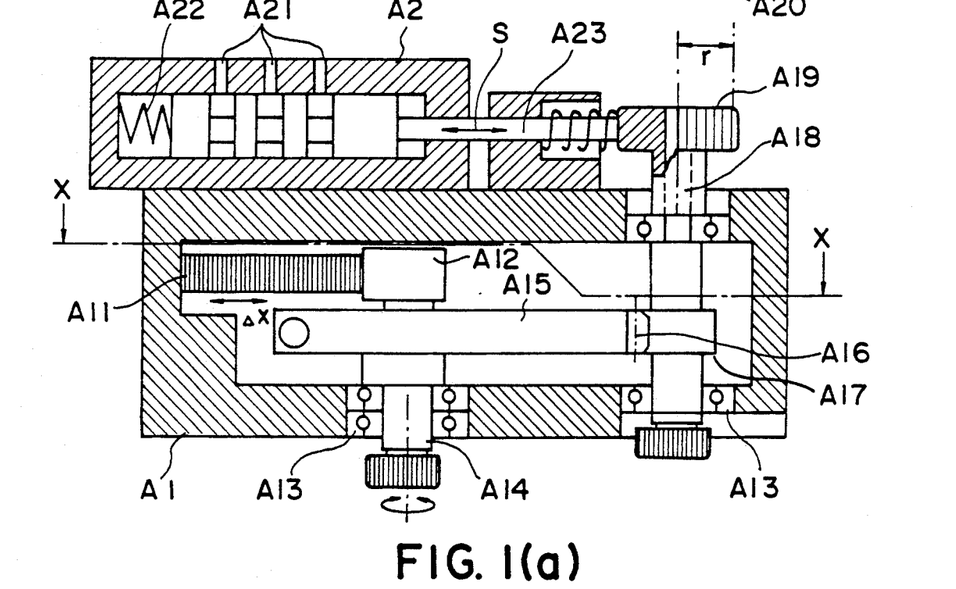
FIG. 1(a) is a cross sectional view illustrating a first embodiment of a high-speed flow control valve of the present invention.
Figure 1B:
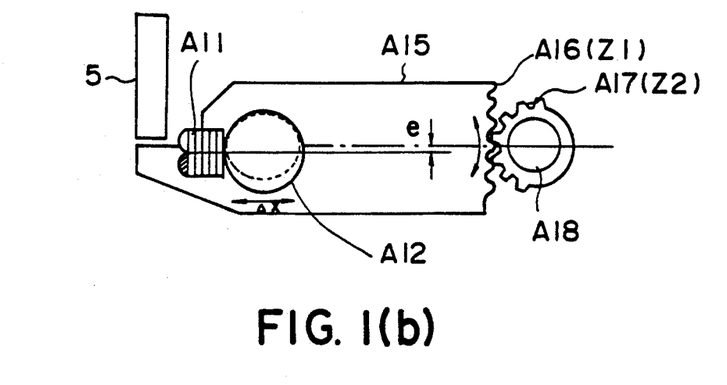
FIG. 1(b) is a cross sectional view taken along the line X—X in FIG. 1(a)
Figure 1C:
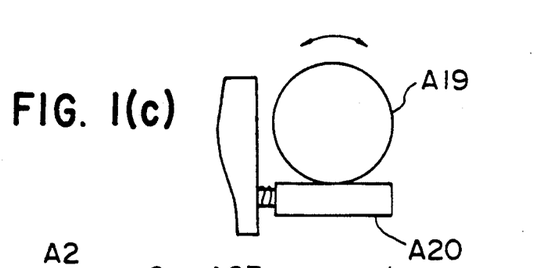
FIG. 1(c) is a detail plan view of the rack and pinion of FIG. 1(a)

As shown in FIG. 1, a high-speed flow control valve in a first embodiment is arranged in such a way that the amount of the directly operated displacement $\Delta x$ of a laminated piezoelectric actuator A11 is amplified to the amount of rotary displacement by means of a cam and a gear mechanism, and this amount is returned to the amount of a directly operated displacement by means of a rack mechanism so that a spool A23 of a flow control valve A2 is directly operated. To explain in detail, in FIGS. 1(a) and 1(b), the high-speed flow control valve is divided into a flow control valve A2 and a conversion section A1. The former A2 is a directional flow switching valve with a return spring A22, which opens and closes fluid input and output slats A21 while it is regulated by means of the former spool A23 so as to control the flow rate. The latter A1 is a conversion section in the case consisting of a laminated piezoelectric actuator A11, a first shaft A14 with a cam and a lever, and a second shaft A18 with a gear and a rack. The first shaft A14 is supported by a bearing A13 so as to be rotatable, and includes a cam A12 for causing an eccentricity (eccentric amount e) with respect to the center of the shaft, and a gear lever A15 having a gear A16 (number of teeth: Z1) in its front end. Meanwhile, the second shaft A18 is held to the case by a bearing A13 so as to be rotatable, and includes a pinion A17 (number of teeth: Z2) that engages with the gear A16 of the lever A15 and a pinion gear A19 in the end of the shaft A18 projecting outside the case. Since the backlash of the pinion gear A19 and the gear A16 is corrected to zero at all times by means of a spool return spring A22, the end surface of the laminated piezoelectric actuator A11 and the surface of the cam A12 contact with each other at all times. The gear A16 and the pinion A17 are engaged with each other al all times, and the pinion gear A19 is engaged with the rack A20 disposed in the end of the spool A23 of the flow control valve A2 at all times. In such construction, the first conversion means refers to the section from the cam A12 to the shaft A18, and the second conversion means refers to the pinion gear A19.

The high-speed flow control valve constructed as described above operates as follows: when the laminated piezoelectric actuator A11 is actuated, an amount of directly operated displacement $\Delta x$ is caused in this actuator. The amount of the directly operated displacement $\Delta x$ causes the lever A15 to rotate for amplification (angle of rotation $= \tan^{-1}(\Delta x/e)$ via the eccentric cam A12 and the shaft A18. It further causes the spool A23 of the flow control valve A2 to directly move via the gear A16 of the end of the lever A15, and the pinion A17 and the pinion gear A19 of the shaft A18. Thus, the amount of the directly operated displacement S of the spool A23 can be expressed as:

$$\{\tan^{-1}(\Delta x/e)\}\cdot(Z1/Z2)\cdot r \approx (\Delta x/e)\cdot(Z1/Z2)\cdot r,$$

(r: pitch radius of the pinion bar A19). The amount of the directly operated displacement of the spool A23 S is amplified at all times proportionally with respect to the amount of the driving directly-operated displacement $\Delta x$ of the laminated piezoelectric actuator A11. Therefore, the very small driven displacement of the laminated piezoelectric actuator A11 can be controlled for amplification continuously and at high speed. Further, since the conversion section A1 of this embodiment is mechanically constructed, it has high strength and therefore can cause the spool A23 to be displaced without being influenced by the fact of how high or how low the fluid pressure is.

Figure 2:
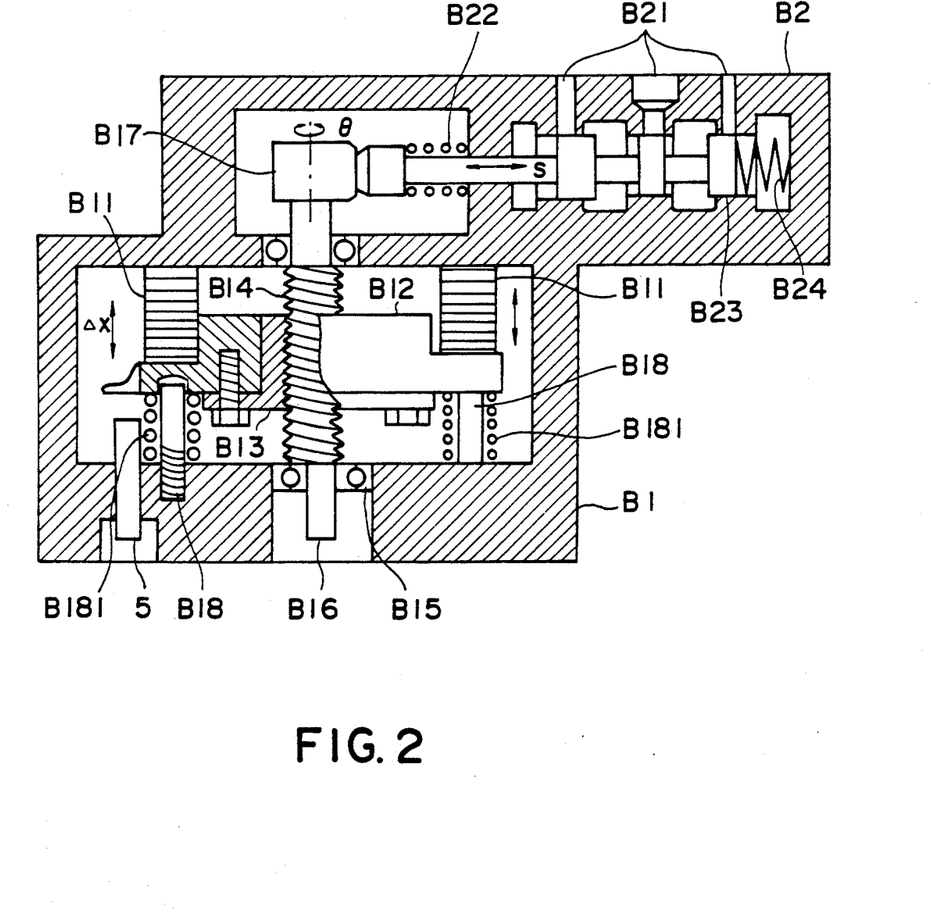
FIG. 2 is a cross sectional view of the high-speed flow control valve according to a second embodiment.
Figure 2A:
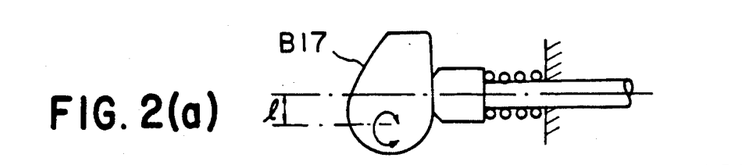
FIG. 2(a) is a detail plan view of the cam and cam follower of FIG. 2.

A high-speed flow control valve according to a second embodiment is shown in FIG. 2. This high-speed flow control valve is designed to amplify the amount of the directly operated displacement $\Delta x$ of laminated piezoelectric actuators B11 disposed in parallel by means of a ball screw mechanism for the purpose of directly operating the spool B23 of a flow control valve B2. To explain in detail, in FIG. 2, the high-speed flow control valve is divided into a flow control valve B2 and a conversion section B1. The former B2 is a directional flow switching valve of a spool type with return springs B22 and B24, which opens and closes fluid input and output slots B21 while it is regulated by means of the former spool B23 so as to control the flow rate. The latter B1 is a conversion section in the case consisting of two laminated piezoelectric actuators B11 in parallel, a plate B12 with a ball nut B13 which is laterally installed on the end surfaces of these actuators, and shaft B16 with a ball screw B14 and a cam B17. The plate B12 receives the reaction force of a spring B181 contained in the case so as to be pressed against the end surfaces of the two laminated piezoelectric actuators B11 at all times. A lead shaft B18 is fixed in the case. This lead shaft is guided by a lead hole of the plate B12 so that the plate B12 is guided so as to move in parallel to the center of the shaft B16. The shaft B16 is held to the case by means of the bearing B15 so as to be rotatable and the ball screw B14 is engaged with the ball nut B13 of the plate B12. Further, a cam B17 is disposed on the end of the shaft B16 projecting outside the case. The surface of the cam B17 is brought into contact with the cam follower formed in the end of the spool B23 of the flow control valve B2.

The high-speed flow control valve constructed as described above in the second embodiment operates as follows: when the laminated piezoelectric actuators B11 are actuated, an amount of a directly operated displacement $\Delta x$ is caused in this actuator. The amount of the directly operated displacement $\Delta x$ causes the plate B12 to move in parallel upwardly and downwardly in the figure and causes the shaft B16 to rotate via the ball nut B13 and the ball screw B14 in the plate B12. At this time, the angle of rotation is amplified because of the screw pitch. In addition, this amplification rotation causes the spool B23 of the flow control valve B2 to be directly operated via the cam B17. In such configuration, the first conversion means refers to the section form the plate B12 to the shaft B16, while the second conversion means refers to the cam B17. To explain the advantages of this embodiment, since the backlash of the gears B13 and B14 is corrected to zero at all times by means of the spool return springs B22, B24, and B181, the amount of the directly operated displacement S of the spool B23 can be operated continuously with respect to the driving directly-operated displacement amount $\Delta x$ of the laminated piezoelectric actuator B11, and even a very small driven displacement of the laminated piezoelectric actuator B11 can be amplified accurately and at high speed. Further, since the conversion section B1 of this embodiment is mechanically constructed, it has high strength and therefore can cause the spool B23 to be displaced without being influenced by the fact of how high or how low the fluid pressure is.

Figure 3:
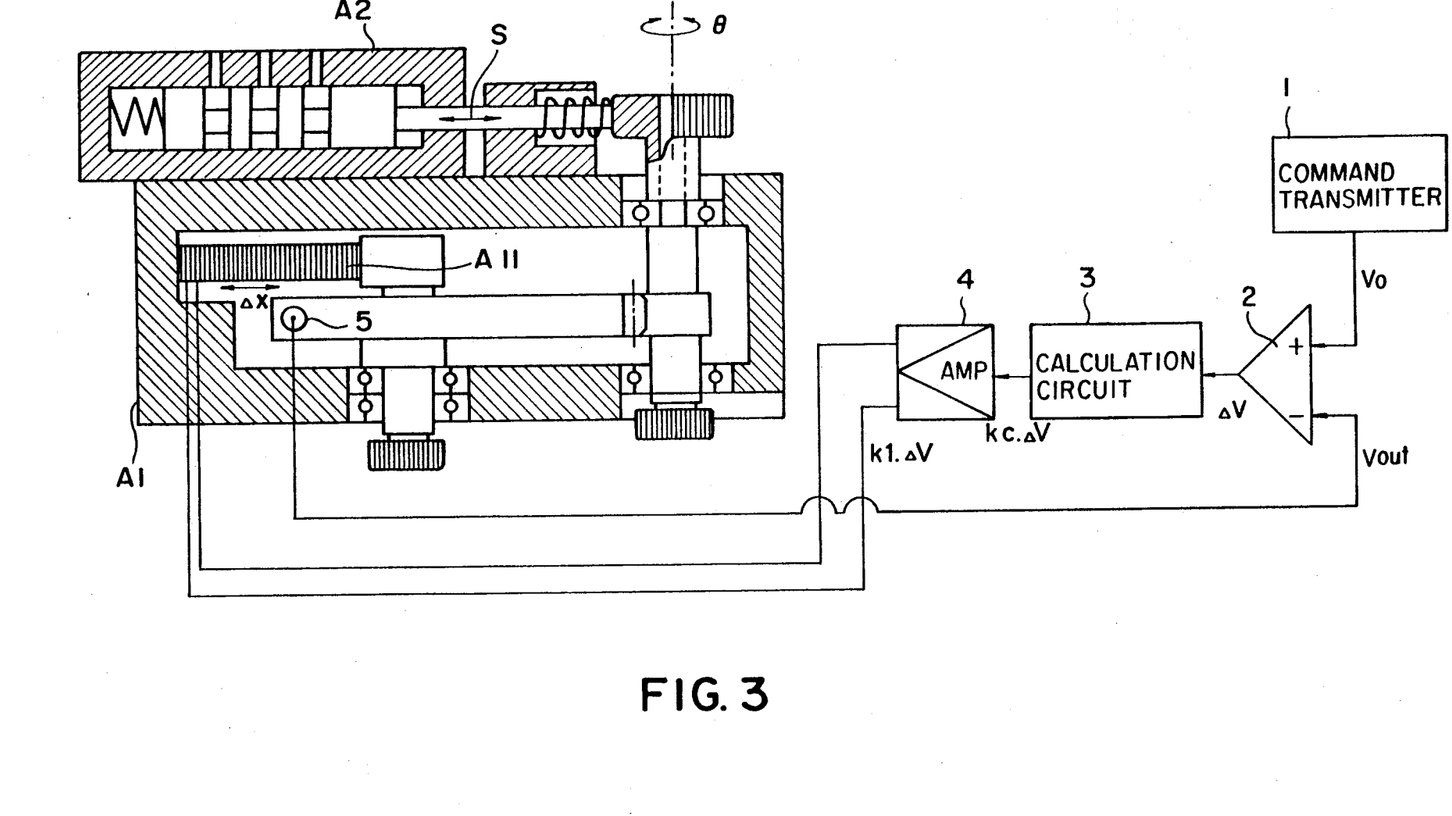
FIG. 3 is a view illustrating the construction of the example.
Figure 4:
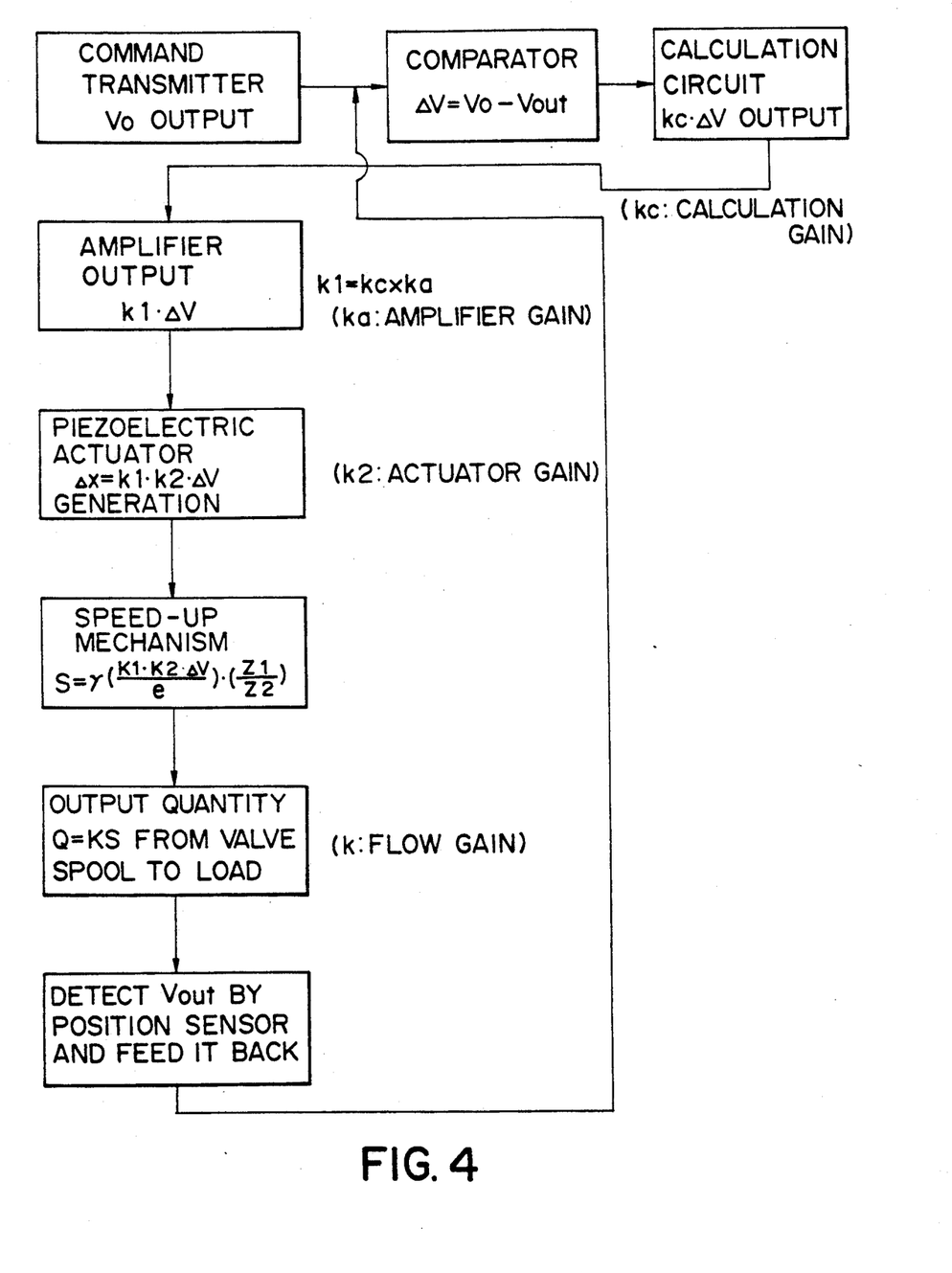
FIG. 4 is a flowchart of the example.
Figure 5:
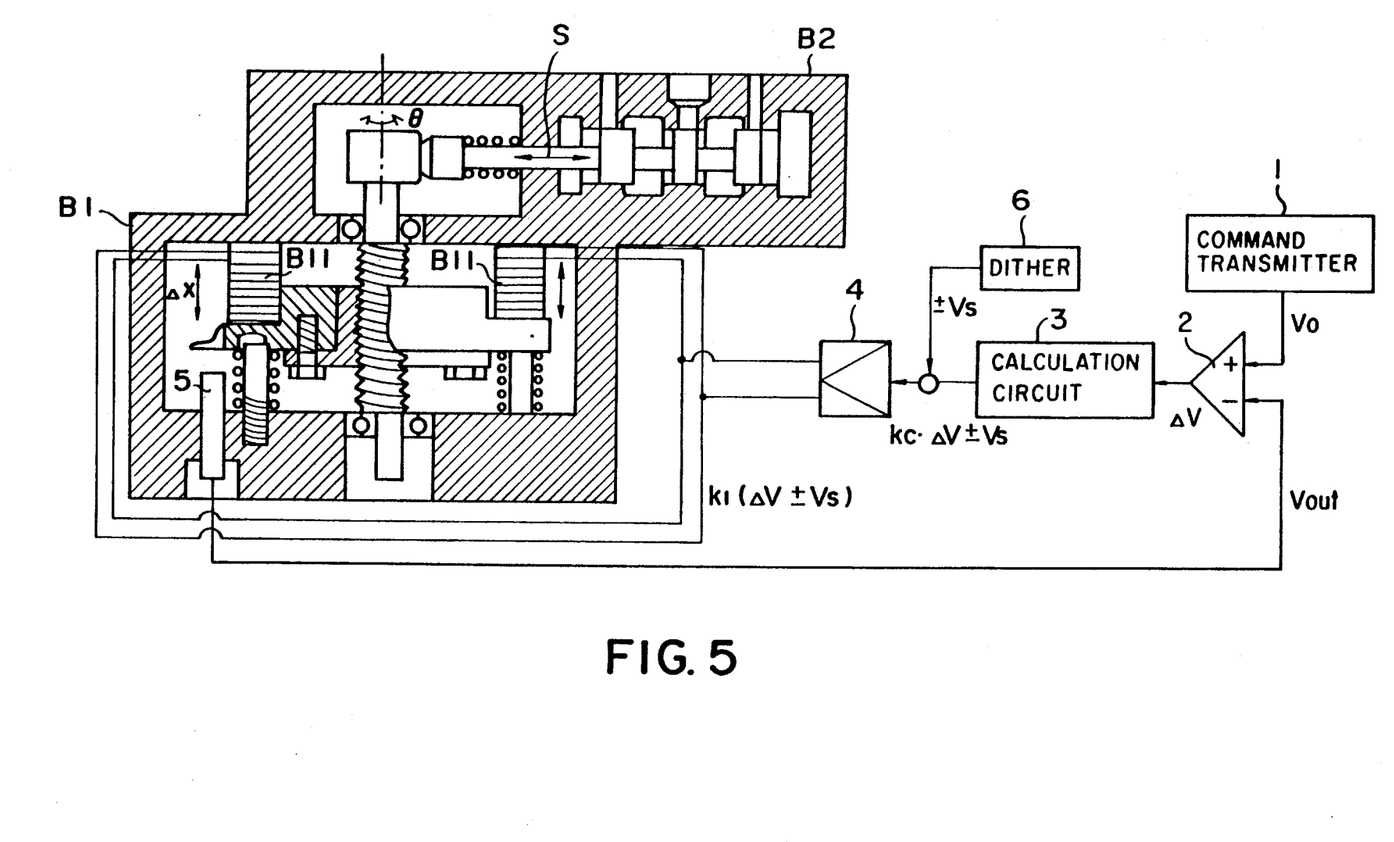
FIG. 5 is a view illustrating the construction of the example according to the second embodiment.
Figure 6:
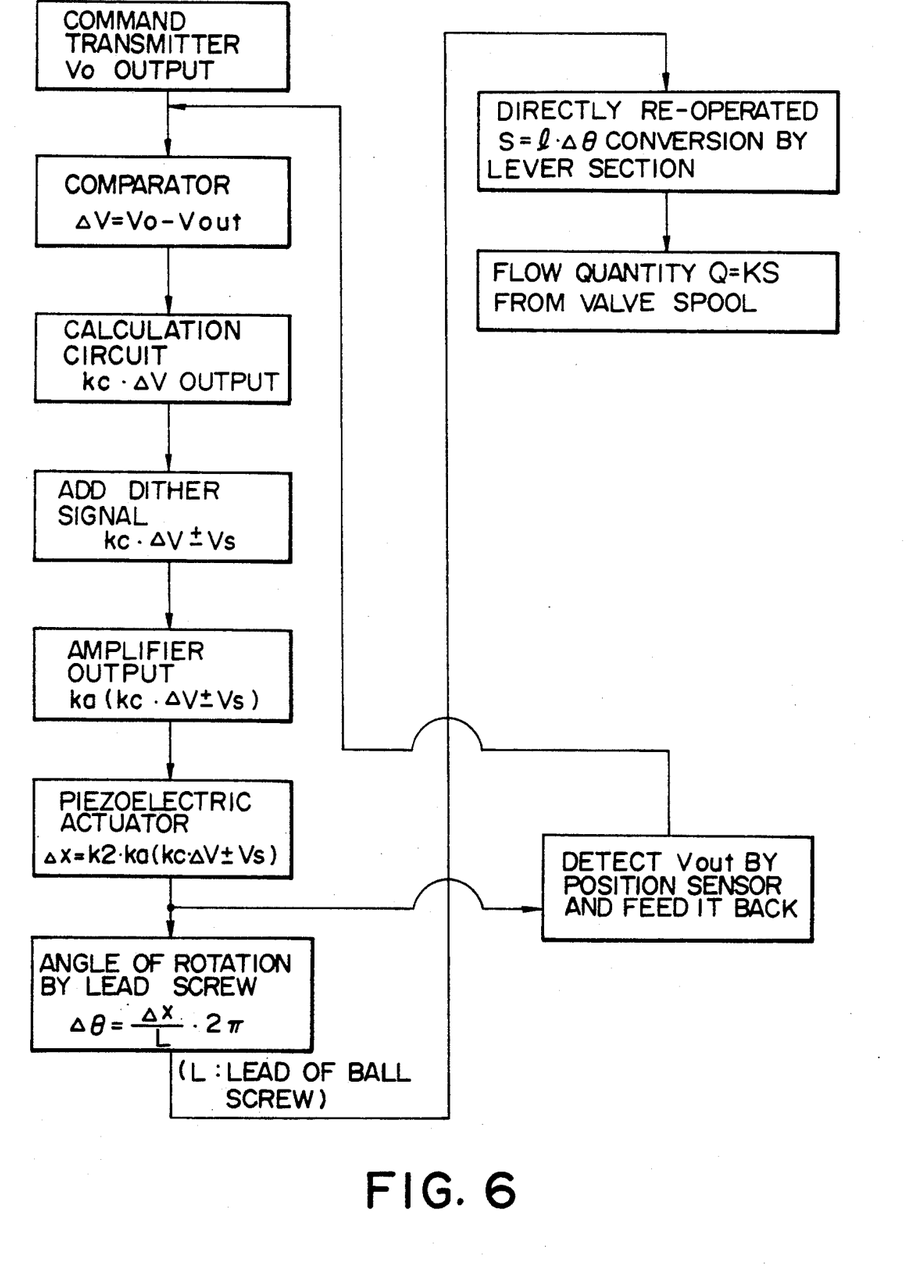
FIG. 6 is a flowchart of the example according to the second embodiment.

Next, examples of uses for each of the above-mentioned embodiments will be explained with reference to FIGS. 3 to 6. A position sensor 5 is additionally installed in each of the above-mentioned embodiments. Further, as external control apparatuses, a command transmitter 1, a comparator 2, a calculation circuit 3, an amplifier 4, and a dither transmission circuit 6 (the dither transmission circuit 6 is installed only in an example of the use of the second embodiment) are formed. That is, a command value Vo transmitted from the command transmitter 1 is compared in the comparator with the displacement amount (vo −Vout) of the laminated piezoelectric actuator detected by the position sensor 5. This result is supplied to the laminated piezoelectric actuators A11 and B11 via the amplifier 4 for the purpose of driving these actuators, after a dither is further supplied when necessary. The details of the examples of the uses mentioned above are shown in the FIGS. (the construction of an example of the use of the first embodiment is shown in FIG. 3 and its flowchart is shown in FIG. 4; the construction of an example of the use of the second embodiment is shown in FIG. 5 and its flowchart is shown in FIG. 6) together with flowcharts, and therefore a detailed explanation thereof has been omitted. As is understood from such examples of uses, the peripheral control of this embodiment can be configured easily.

INDUSTRIAL APPLICABILITY

The high-speed flow control valve of the present invention can be used for the purpose of controlling the flow rate in valves of hydraulic and pneumatic apparatuses and robots that require high-speed response and continuous control for medium to high pressures.

What is claimed is:

1. A high-speed flow control valve, comprising:
   a laminated piezoelectric actuator which is a driving source;
   first conversion means for converting a linear displacement of said laminated piezoelectric actuator to a rotary displacement;
   second conversion means for returning said rotary displacement to a linear displacement; and
   a valve spool which operates in linkage with said second conversion means;
   wherein said first conversion means includes a first rotatable shaft on which a gear lever is mounted, a second rotatable shaft on which a first pinion that engages with said gear lever is mounted, and a cam for receiving the linear displacement of said laminated piezoelectric actuator as a rotary tangential line force at a position deviated from the center of said first rotatable shaft, said cam being disposed on the first rotatable shaft.

2. A high-speed flow control valve as claimed in claim 1 wherein said second conversion means comprises a rack connected to said valve spool, and a second pinion that engages with said rack, said second pinion being positioned on said second rotatable shaft.

3. A high-speed flow control valve as claimed in claim 2, wherein the backlash of said second pinion and said gear lever is corrected to zero at all times by a spool return spring.

4. A high-speed flow control valve as claimed in claim 3 wherein said cam is in contact with said laminated piezoelectric actuator at all times, and wherein said gear lever is in contact with said first pinion at all times.

5. A high-speed flow control valve as claimed in claim 4 wherein said valve is a directional flow switching valve of a spool type wherein the valve spool opens and closes fluid input and output slots and controls the flow rate therethrough.

6. A high-speed flow control valve as claimed in claim 4 wherein a mechanism for amplifying a displacement is disposed in said first conversion means.

7. A high-speed flow control valve as claimed in claim 2, wherein a mechanism for amplifying a displacement is disposed in said first conversion means.

8. A high-speed flow control valve as claimed in claim 2 wherein said valve is a directional flow switching valve of a spool type wherein the valve spool opens and closes fluid input and output slots and controls the flow rate therethrough.

9. A high-speed flow control valve as claimed in claim 1 wherein said valve is a directional flow switching valve of a spool type wherein the valve spool opens and closes fluid input and output slots and controls the flow rate therethrough.

10. A high-speed flow control valve as claimed in claim 1, wherein a mechanism for amplifying a displacement is disposed in said first conversion means.

11. A high-speed flow control valve as claimed in claim 1 wherein said cam is in contact with said laminated piezoelectric actuator at all times, and wherein said gear lever is in contact with said first pinion at all times.

12. A high-speed flow control valve, comprising:
a laminated piezoelectric actuator which is a driving source;
first conversion means for converting a linear displacement of said laminated piezoelectric actuator to a rotary displacement;
second conversion means for returning said rotary displacement to a linear displacement; and
a valve spool which operates in linkage with said second conversion means;
wherein said second conversion means comprises a rack connected to said valve spool, and a pinion that engages with said rack.

13. A high-speed flow control valve as claimed in claim 12, wherein the backlash of said pinion is corrected to zero at all times by a spool return spring.

14. A high-speed flow control valve as claimed in claim 3 wherein said valve is a directional flow switching valve of a spool type wherein the valve spool opens and closed fluid input and output slots and controls the flow rate therethrough.

15. A high-speed flow control valve, comprising:
a laminated piezoelectric actuator which is a driving source;
first conversion means for converting a linear displacement of said laminated piezoelectric actuator to a rotary displacement;
second conversion means for returning said rotary displacement to a linear displacement; and
a valve spool which operates in linkage with said second conversion means;
wherein said first conversion means includes a rotatable shaft which is rotatably supported, and a plate that is in linkage with said laminated piezoelectric actuator, and wherein said first conversion means converts the displacement of the plate to the rotation of the rotatable shaft, with the engagement between said rotatable shaft and said plate being a screw engagement.

16. A high-speed flow control valve as claimed in claim 15, wherein said second conversion means comprises a cam disposed on said rotatable shaft, and a cam follower associated with said cam and connected to the valve spool.

17. A high-speed flow control valve as claimed in claim 16 wherein said valve is a directional flow switching valve of a spool type wherein the valve spool opens and closes fluid input and output slots and controls the flow rate therethrough.

18. A high-speed flow control valve as claimed in claim 15, wherein said screw engagement is formed from a ball screw having small leads.

19. A high-speed flow control valve as claimed in claim 15, further comprising a second laminated piezoelectric actuator positioned in parallel with the first said laminated piezoelectric actuator, and wherein said plate is in linkage with the two laminated piezoelectric actuators.

20. A high-speed flow control valve, comprising:
a laminated piezoelectric actuator which is a driving source;
first conversion means for converting a linear displacement of said laminated piezoelectric actuator to a rotary displacement;
second conversion means for returning said rotary displacement to a linear displacement; and
a valve spool which operates in linkage with said second conversion means;
wherein said second conversion means comprises a cam disposed on a rotatable shaft, and a cam follower associated with said cam and connected to the valve spool.

* * * * *

UNITED STATES PATENT AND TRADEMARK OFFICE
CERTIFICATE OF CORRECTION

PATENT NO. : 5,148,833
DATED : September 22, 1992
INVENTOR(S) : Kazuo OTA

It is certified that error appears in the above-identified patent and that said Letters Patent is hereby corrected as shown below:

Column 1, line 48, change "sued" to --used--.

Column 1, lines 63-65, delete the entire sentence "If it were used as a flow control valve for medium to high pressures that requires a large spring constant."

Column 3, line 14, change "object" to --objects--.

Column 3, line 52, change "herein under" to --hereinunder--.

Column 3, line 67, change "slats" to --slots--.

Column 4, line 20, change "al all" to --at all--.

Column 4, line 32, change "($\Delta x/e$)" to --($\Delta x/e$))--.

Column 4, line 41, change "bar" to --gear--.

Column 5, line 3, change "and shaft" to --and a shaft--.

Column 5, line 33, change "form" to --from--.

Col. 5, lines 59 and 60, change "comparator with" to --comparator 2 with--.

Column 5, line 60, change "(vo" to --($V_o$--.

UNITED STATES PATENT AND TRADEMARK OFFICE
CERTIFICATE OF CORRECTION

PATENT NO. : 5,148,833
DATED : September 22, 1992
INVENTOR(S) : Kazuo OTA

It is certified that error appears in the above-identified patent and that said Letters Patent is hereby corrected as shown below:

Column 7, line 30, change "claim 3" to --claim 13--.

Column 7, line 32, change "closed" to --closes--.

Signed and Sealed this

Twenty-second Day of March, 1994

Attest:

BRUCE LEHMAN

Attesting Officer         Commissioner of Patents and Trademarks